United States Patent
Orlowski

(10) Patent No.: US 10,921,838 B2
(45) Date of Patent: Feb. 16, 2021

(54) RESPONDING TO POSITIVE RATE OF CHANGE OF FUEL CELL VOLTAGE DURING POWER REDUCTION TRANSITIONS

(71) Applicant: Audi AG, Ingolstadt (DE)

(72) Inventor: Daniel F. Orlowski, Manchester, CT (US)

(73) Assignee: Audi AG, Ingolstadt (DE)

(*) Notice: Subject to any disclaimer, the term of this patent is extended or adjusted under 35 U.S.C. 154(b) by 1474 days.

(21) Appl. No.: 14/441,817

(22) PCT Filed: Nov. 9, 2012

(86) PCT No.: PCT/US2012/064304
§ 371 (c)(1),
(2) Date: May 8, 2015

(87) PCT Pub. No.: WO2014/074101
PCT Pub. Date: May 15, 2014

(65) Prior Publication Data
US 2015/0286234 A1    Oct. 8, 2015

(51) Int. Cl.
*G05F 1/66* (2006.01)
*H01M 8/04537* (2016.01)
(Continued)

(52) U.S. Cl.
CPC ............ *G05F 1/66* (2013.01); *H01M 8/0488* (2013.01); *H01M 8/0494* (2013.01); *H01M 8/04544* (2013.01); *H01M 8/04552* (2013.01); *H01M 8/04559* (2013.01); *H01M 8/04873* (2013.01); *H01M 8/04619* (2013.01); *H01M 8/04753* (2013.01); *H01M 8/04992* (2013.01);
(Continued)

(58) Field of Classification Search
CPC . G05F 1/66; H01M 8/04544; H01M 8/04552; H01M 8/04873; H01M 8/0488; Y10T 307/604
USPC .......................................................... 307/62
See application file for complete search history.

(56) References Cited

U.S. PATENT DOCUMENTS

| 6,023,938 A | 2/2000 | Taras et al. |
| 6,680,592 B2 * | 1/2004 | Blum ...................... B60L 15/20 318/139 |

(Continued)

FOREIGN PATENT DOCUMENTS

| CN | 101523651 A | 9/2009 |
| EP | 2 237 351 A1 | 10/2010 |

(Continued)

*Primary Examiner* — Rexford N Barnie
*Assistant Examiner* — Swarna N Chowdhuri
(74) *Attorney, Agent, or Firm* — Seed Intellectual Property Law Group LLP

(57) ABSTRACT

During power reduction transitions of a fuel cell power plant, the excess electric energy generated by consumption of reactants is extracted, during one or more periods of time, by a voltage limiting device control (200) in response to a controller (185) as i) energy dissipated in a resistive auxiliary load or ii) as energy applied to an energy storage system (201) (a battery), in boost and buck embodiments. The controller operates the voltage limiting device control in response to the positive time derivative of the voltage of one or more of the fuel cells exceeding a predetermined limiting value.

21 Claims, 6 Drawing Sheets

(51) Int. Cl.
  *H01M 8/04828*  (2016.01)
  *H01M 8/04858*  (2016.01)
  *H01M 8/04746*  (2016.01)
  *H01M 8/1018*  (2016.01)
  *H01M 16/00*  (2006.01)
  *H01M 8/04992*  (2016.01)

(52) U.S. Cl.
  CPC ........ *H01M 16/003* (2013.01); *H01M 16/006* (2013.01); *H01M 2008/1095* (2013.01); *H01M 2250/20* (2013.01); *Y02T 90/40* (2013.01)

(56) References Cited

U.S. PATENT DOCUMENTS

| | | | |
|---|---|---|---|
| 6,946,818 B2 * | 9/2005 | Cawthorne | B60W 10/26 320/134 |
| 7,790,303 B2 | 9/2010 | Fredette | |
| 2006/0068249 A1 * | 3/2006 | Fredette | H01M 16/006 429/429 |
| 2009/0098427 A1 | 4/2009 | Reiser | |
| 2010/0291447 A1 | 11/2010 | Imanishi et al. | |
| 2011/0181113 A1 * | 7/2011 | Hung | H01M 8/0488 307/34 |
| 2011/0223506 A1 * | 9/2011 | Lienkamp | H01M 8/04753 429/432 |
| 2013/0320910 A1 * | 12/2013 | Reiser | H01M 8/04626 320/101 |

FOREIGN PATENT DOCUMENTS

| | | |
|---|---|---|
| JP | H09182311 A | 7/1997 |
| JP | 2009-32418 A | 2/2009 |
| JP | 2010-129293 A | 6/2010 |
| JP | 2011-15537 A | 1/2011 |
| KR | 1019990039187 A | 6/1999 |
| KR | 2000-0023117 A | 4/2000 |
| WO | 2008/127354 A2 | 10/2008 |
| WO | 2012/115605 A1 | 8/2012 |

* cited by examiner dropped# RESPONDING TO POSITIVE RATE OF CHANGE OF FUEL CELL VOLTAGE DURING POWER REDUCTION TRANSITIONS

TECHNICAL FIELD

This modality relates to dissipating or storing electrical energy extracted from a fuel cell stack during power reduction transitions, in one or several steps, in response to the positive rate of change of fuel cell voltage.

BACKGROUND

When power draw on a fuel cell power plant is reduced or removed, as shown in FIG. 8, the fuel cell reduces or stops converting hydrogen fuel into electricity. If this excess fuel is dumped, it can cause operational issues, such as excess temperature of the power plant. This is typical of all fuel cell power plants since the reaction time of the chemical and mechanical balance of plant components are inherently magnitudes slower than the electrical load changes. When a down-transient (electrical load removal or decrease) occurs, there is a period of time where the fuel cell balance of plant continues to supply reactants to the fuel cell (hydrogen/air) at the same rate as before the occurrence of the down-transient. See FIG. 10. This is due, in part, to monitoring cell voltage, and initiating response, such as power dissipation or storage, only when cell voltage approaches a damaging value. See FIG. 9. The result is excess energy, typically in the form of unused (unconsumed) hydrogen gas.

In many systems, this gas is recycled into a reformer or in others expelled to the surrounding atmosphere. In all cases, the fuel cell balance of plant is responding to the rapid down transient which presents difficulty in balancing controls to prevent 1) over temperature of a reformer or explosive limits in the atmosphere, and 2) under-shoot of the fuel supply, while dealing with 3) the unknown number of repetitive occurrences of down-transients, the duration of the transients, and magnitude of the transients.

The result is a system whose continued operation is dependent upon this delicate balance of many variables and some unknowns.

It has been known, i.e., in U.S. Pat. No. 7,790,303, that corrosion of amorphous carbon catalyst supports and metal catalyst, which occurs during startup and shutdown or other power reduction transitions of polymer electrolyte membrane (PEM) fuel cells, results in a permanent decay of fuel cell performance. It has also been known that the corrosion is due to a reverse current situation in which the cathode potential may be well in excess of one volt higher than the potential of a standard hydrogen electrode. This potential causes the carbon based catalyst support to corrode and results in decreased cell performance.

In automotive applications, which may experience 50,000-100,000 startup/shutdown cycles and acceleration/deceleration cycles, this results in catastrophic performance loss. Voltage limiting devices (VLDs), used on fuel cell power plants to dissipate or store excess power during a power reduction, typically comprise fast acting IGBT or MOSFET devices with associated controls to detect cell stack voltage rising above a predefined, over-voltage limit, as shown in FIG. 9.

SUMMARY

This modality utilizes these same devices and controls, but adds another dimension to the controls: detecting the slope of the cell stack voltage, using a continuous derivative with associated filters for noise. The electrical load being removed or sharply reduced is detected by a sharp rise in the rate at which cell stack voltage increases. Upon detection, cathode air may be diverted, and the VLD (dissipater or storage) may turn on, to control the power dissipation and control the slope of the cell stack voltage. This results in a gradual release of electrical power. By utilizing the VLD to respond to down-transients in response to the rate of change of cell voltage, the response time of the balance of plant chemical and mechanical components are decoupled from the changes in electrical load. Therefore, a more robust fuel cell system is realized. The rapid engagement of the gradual release of power allows for the slower chemical and mechanical balance of plant components to respond and react to the change in unison. This feature can be tuned for the particular power plant and load, to match the response speed of the balance of plant.

The modality herein allows VLD response in a series of stages to reach a succession of power goals, if desired.

This modality is so responsive that it may obviate the need to initiate cell voltage limiting steps in response to shutdown per se.

Other variations will become more apparent in the light of the following detailed description of exemplary embodiments, as illustrated in the accompanying drawings.

BRIEF DESCRIPTION OF THE DRAWINGS

FIGS. 8-10 relate to the prior art and FIGS. 11-14 relate to response of the present modality.

MODE(S) OF IMPLEMENTATION

Figure 1:
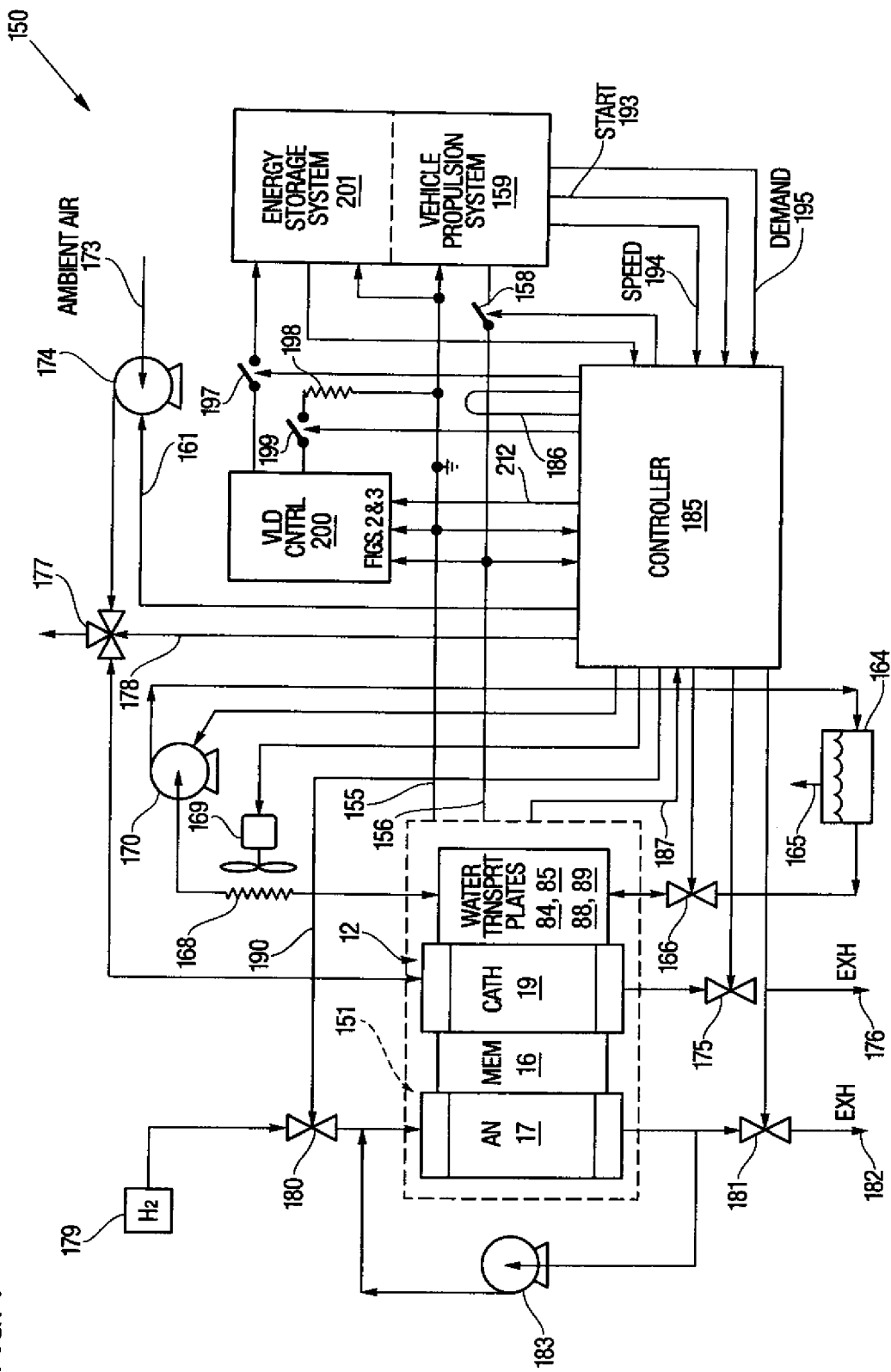
FIG. 1 is a schematic block diagram of a fuel cell power plant that stores or dissipates the energy of a fuel cell stack during power reduction transitions, and may divert cathode air as well.

Referring to FIG. 1, a vehicle 150 includes a fuel cell stack 151 comprising a plurality of contiguous fuel cells, each having a membrane electrode assembly (MEA) 16, only one fuel cell 12 being shown in FIG. 1. The electrical output at the positive and negative terminals of the fuel cell stack 151 is connected by a pair of lines 155, 156 through a switch 158 to a vehicle propulsion system 159. The output is also connected to a VLD control 200 through a line 160.

A reservoir 164 of a water circulation system has a vent 165. The water circulation system may include a trim valve 166, water passages, such as those within water transport plates 84, 86, 88, 89, a radiator and fan 168, 169 which is selectively operable to cool water circulating in the system, and a controllable water pump 170.

Ambient air at an inlet 173 is provided by a pump, such as a blower 174, to the oxidant reactant gas flow fields of the cathode 19, and thence through a pressure regulating valve 175 to exhaust 176. The oxidant air passes through a diverter valve 177 which can be opened a selected amount, by a signal from the controller on a line 178, to discharge air so that the blower 174 may remain at operating speed, for quick response later, while reducing power generation in the stack, as described in patent publication 2009/0098427. Hydrogen is supplied from a source 179 through a flow regulating valve 180 to the fuel reactant gas flow fields of the anode 17, and thence through a pressure regulating valve 181 to exhaust 182. A fuel recycle loop includes a pump 183.

A controller 185 responds to load current determined by a current detector 186 as well as to the voltage across the lines 155, 156; it may also have temperature of the stack provided on a line 187. The controller, in turn, can control the valve 180 over a line 190 as well as controlling the other valves, the switches 158, 160, 162 and the pumps 170, 174, as shown in FIG. 1.

The controller 185 responds to start, speed and demand control signals from the vehicle propulsion system 159 on lines 193-195, which will indicate when the fuel cell should commence operation, and the amount of power being demanded by the vehicle propulsion system. Whenever a start signal is sent from the vehicle propulsion system 159 over the line 193 to the controller 185, signals from the controller will cause the valves 180, 181 and the pump 183 to be operated appropriately so as to provide fuel reactant gas to the flow fields of the anode 17, and then the valve 175 and pump 174 will be operated appropriately to provide ambient air to the flow fields of the cathode 19.

When fuel and air of sufficient quantity have been provided uniformly to the cells, open circuit voltage will be detected on the lines 155, 156 by the controller 185. At that time, the controller may close a switch 199 or close a switch 197, or both, so as to connect the fuel cell stack 151 through the VLD control 200 to an auxiliary load 198 or to the storage control 201, or to both, and will also close the switch 158 so as to connect the fuel cell stack 151 to the vehicle propulsion system 159 at the same time, or later.

Whenever a shutdown signal is received from the vehicle propulsion system 159, the signal on line 212 will selectively energize the VLD control 200 as the switch 158 is opened so as to disconnect the vehicle from the fuel cell power plant.

The VLD controller 200, described hereinafter with respect to FIGS. 2-5, will direct the power, generated by residual reactant in or flowing through the fuel cells, to the energy storage system 201, if the storage device is not fully charged, in response to the controller 185 closing a switch 197. Or, the VLD controller 200 will direct residual power to a resistive auxiliary load 198 which will dissipate the power as heat, in response to the controller closing the switch 199. Or, both switches 197, 198 may be closed in some circumstances.

Alternatively or additionally, the two-way diverter valve 177 is adjusted by a signal on line 178 to provide none, some or all of the air from the pump 174 to the oxidant reactant gas flow fields of the cathode 19. When the load demand drops to the point at which the fuel cells approach open circuit voltage, such as when the vehicle slows, stops or travels downhill, a signal from the controller on line 178 adjusts the valve 177 to immediately divert some or all of the air to ambient. During low demand, the air pump may be operated at an air flow rate in excess of the flow required in the fuel cells so that the stack can respond quickly to increased demand later. If desired in any given implementation, the controller may provide a signal on the line 178 as an inverse function of the load so that the diverter valve 177 diverts an appropriately proportional amount of air to ambient.

When air is dumped, fuel is also dumped through the exhaust valve 181. But the residual air and fuel continue to generate power, and the dumped fuel raises issues described hereinbefore.

By utilizing the diverter valve 177 to dump the air, the pump 174 can remain running and the amount of air flowing to the cathode is reduced so that only a small amount of residual air remains in the cathode flow fields and in the electrode structures. In some embodiments, the speed of the pump 174 may be reduced during low loads, or even stopped.

The VLD control 200 will store excess power or dissipate it, depending on the controller selecting storage or auxiliary load by closing one of the switches 197, 199. The VLD control 200 extracts the energy stored in the fuel cell stack, during startup and shutdown, or other power reduction transitions when selected. The energy storage system 201 (ESS) in the present embodiment is the battery of an electric vehicle which is powered by the vehicle propulsion system 159. In other embodiments, the ESS 201 may be some other battery, it may be a capacitor, or it may be some other electrical storage device.

Figure 2:
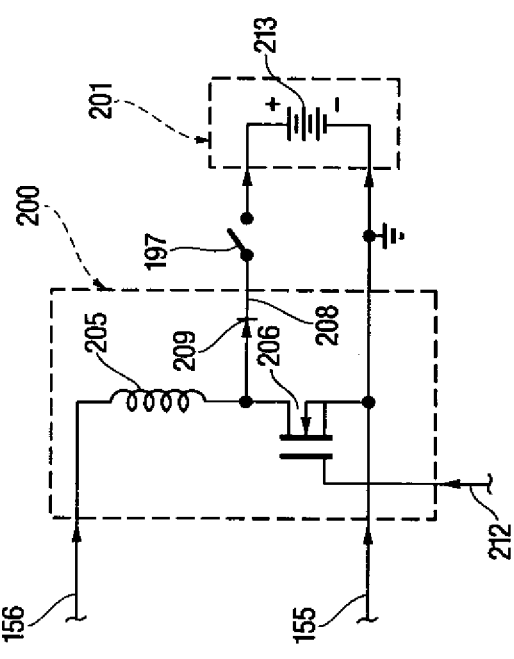
FIGS. 2 and 3 are schematic diagrams of prior art boost configuration and buck configuration, respectively, controls for power storage or power dissipation, in response to the modality herein.

The VLD control 200 may take the form shown in FIG. 2, which is a boost configuration useful when the voltage output of the stack is lower than the voltage at which energy is to be stored in the energy storage system or dissipated in auxiliary load 198. In FIG. 2, an inductor 205 is connected between the electric output terminals 155, 156 of the fuel cell stack 151, in series with an electronic switch 206, which may be an insulated gate bipolar transistor, as shown, or any other suitable electronic switch.

The output of the storage control on a line 208 is taken from the juncture of the inductor and the switch 206 through a unilaterally conducting device such as a diode 209. In order to transfer energy from the cell stack 151 when the output voltage thereof is less than the voltage at which the energy is to be stored in the ESS, the switch 206 is first gated on by a signal on a line 212 from the controller 185 (FIG. 1), so a current builds up in the inductor 205. After a time, the switch 206 is gated off and the current in the inductor will continue to flow through the diode 209 and the output line 208 into the energy storage system 201 (FIG. 1), which may be a battery 213. The current through the output line 208 (and the other terminal 155 of the fuel cell stack) is stored in the ESS 201. When energy leaves the fuel cell stack, in the form of current, the voltage in the fuel cell stack will decrease. This process is continued until the desired energy has been extracted from the fuel cell stack.

Figure 4:
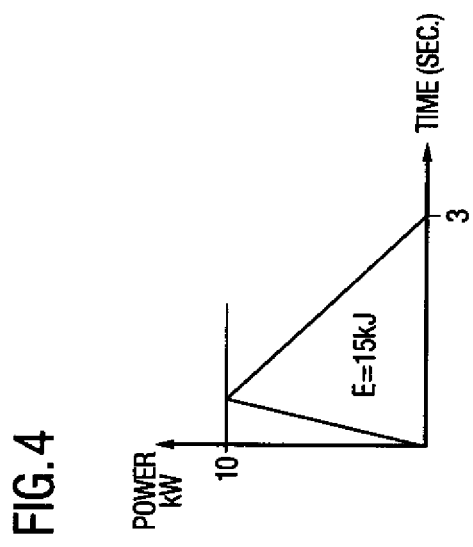
FIGS. 4 and 5 are graphs of load power versus time.

As an example of the energy relationship, FIG. 4 illustrates that the amount of energy to be transferred from the fuel cell stack can be calculated by plotting the output of the fuel cell stack, the transferred energy being represented by the area of the curve. The amount of energy is represented by the integrated power versus time that is generated by the fuel cell stack during a negative power transition. In this example, the energy, E, is equal to 10 kiloJoules and the power is dissipated in three seconds.

Figure 5:
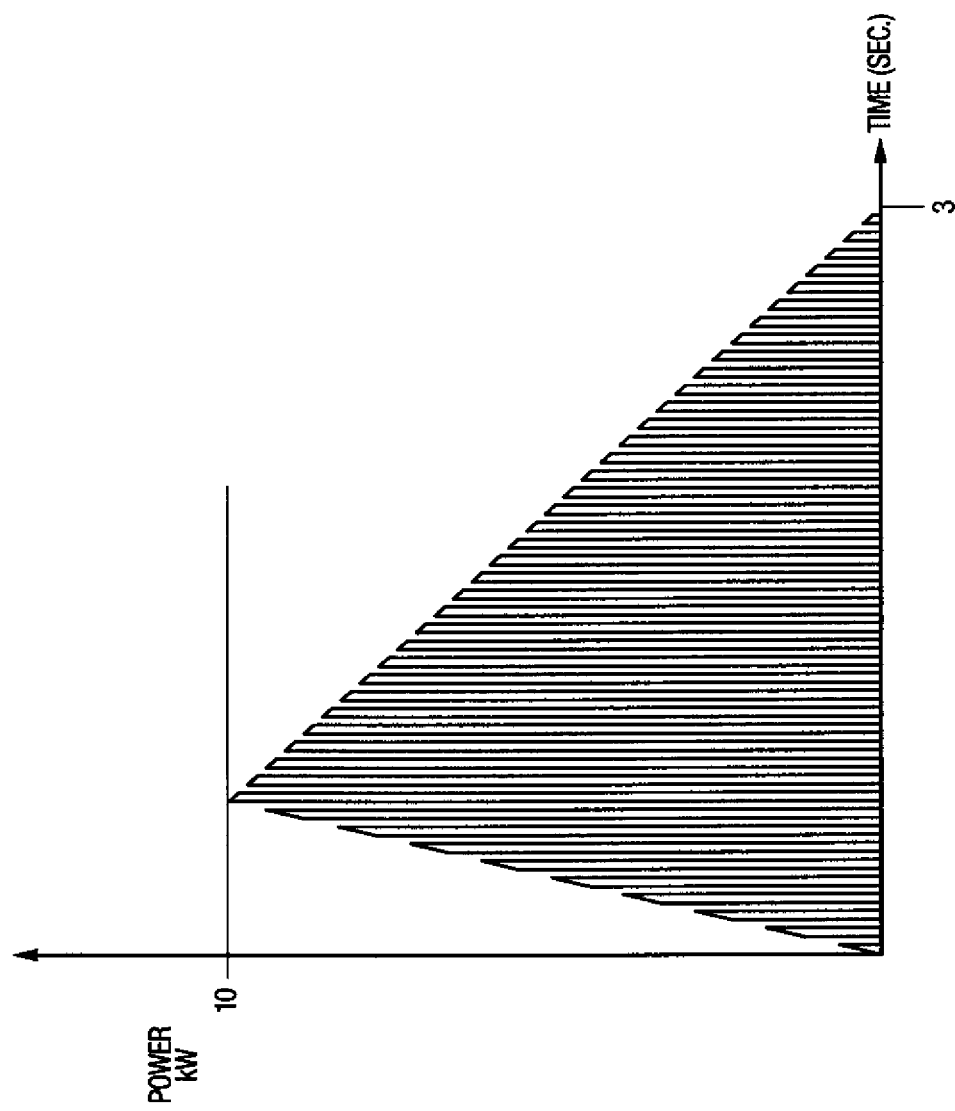

In this embodiment, the energy is not taken out uniformly, as can be seen in FIG. 4. Instead, the transfer of power quickly reaches a maximum, and then decreases with respect to time. In the configurations described with respect to FIGS. 2 and 3, the energy is transferred in increments, as the switch 206 is gated on and off, as illustrated in FIG. 5.

Figure 3:
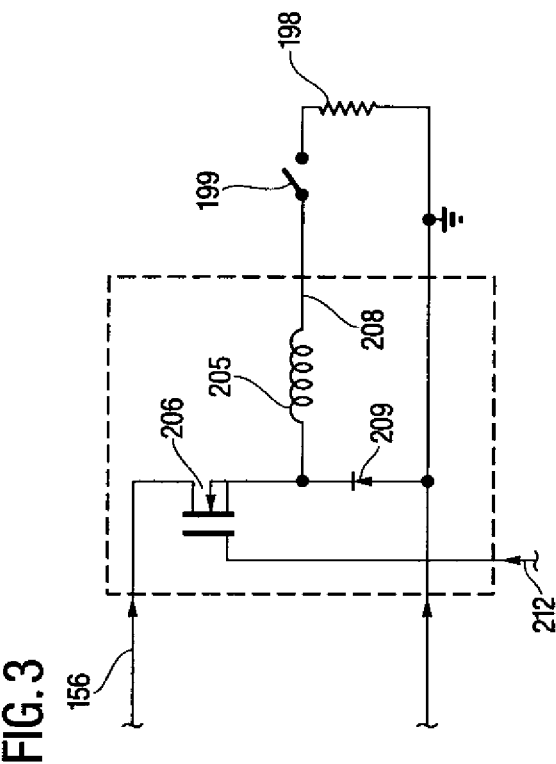

The buck configuration of FIG. 3 is used when the voltage of the fuel cell stack is greater than the voltage at which energy is to be dissipated in the auxiliary load 198 or stored in the ESS 201. The switch 206 is in series with the inductor 205, between one electrical terminal 156 of the fuel cell stack and the auxiliary load 198. The diode 209 is connected from the other electrical terminal 155 of the fuel cell stack to the juncture between the inductor 205 and the switch 206. The switch 206 is gated on by a signal on the line 212 causing a current to flow from the terminal 156 through the inductor 205 and into the auxiliary load 198 over the output line 208 and switch 199. Then, the switch 206 is gated off, at which time current will flow through the diode 209 and the inductor 205 over the output line 208 and switch 199 to the auxiliary load 198. The current flow through the switch 206 and inductor 205 causes the voltage of the fuel cell stack to decrease. The switching process is repeated until the desired energy has been extracted from the fuel cell stack, as described with respect to FIGS. 4 and 5 hereinbefore.

In the configuration of FIGS. 2 and 3, control over the switching of electronic switch 206 by the signal on the line 212 allows use for startup and for shutdown or other power reduction transitions, wherein the energy requirements may differ between startup and shutdown and other power reduction transitions. The sizing of the components 198, 205, 206, 209, will be determined to carry the maximum current required for startup/shutdown/power reduction.

Other configurations, particularly switching configurations may be utilized, including use of an isolation transformer which could step the voltage up or down, in dependence on the system in which the invention is used, the transformed current then rectified for storage in a capacitor or a battery, or other suitable storage system. In this embodiment, the storage system is electrical, but other storage systems may be utilized, including mechanical systems.

The control configuration of FIG. 2 may also be used with the auxiliary load 198, and the control configuration of FIG. 3 may also be used with the ESS 201.

Figure 8:
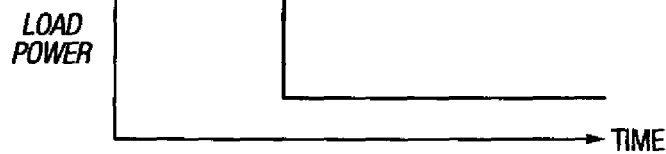
FIGS. 8-14 are a series of diagrams on a common time base, of events and values relating to a power reduction transition.
Figure 9:
Figure 10:
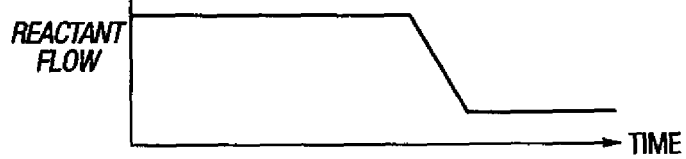

Prior methods respond to power reduction transitions, including activating power reduction and fuel cell voltage control, in response to fuel cell voltage reaching a threshold (FIGS. 8-10, hereinbefore).

Figure 6A:
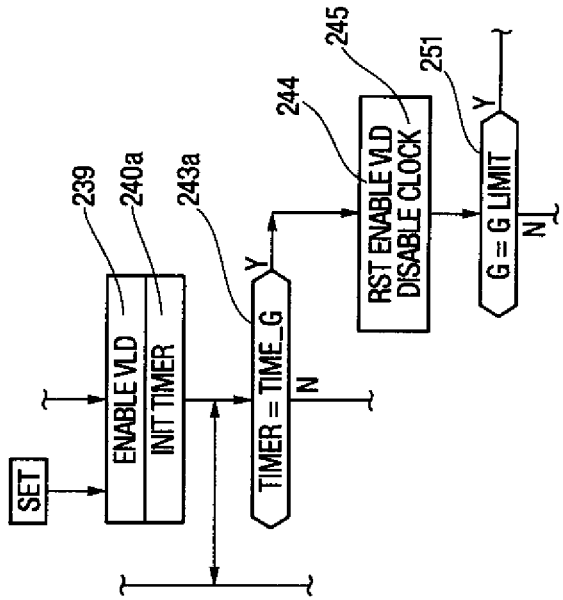
FIG. 6A is a fractional simplified flow diagram of a variant of FIG. 6.
Figure 6:
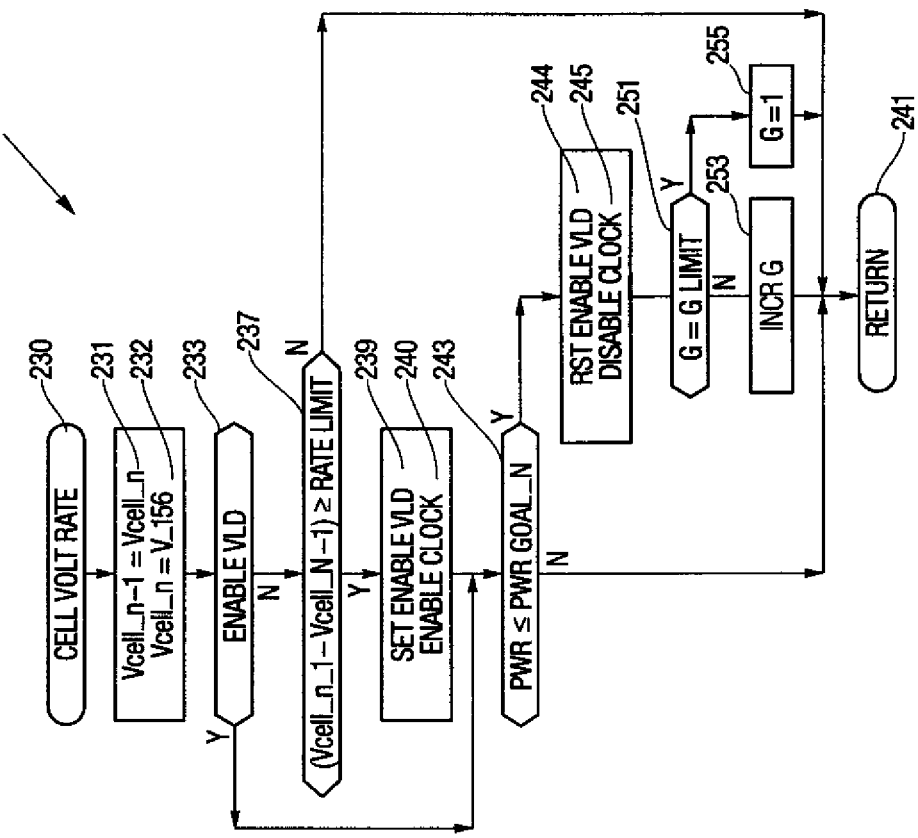
FIG. 6 is a simplified flow diagram of functions for performing a rudimentary embodiment of the modality herein, with multiple load power goals.

A simplified illustration of the manner of performing the present modality employing software within the controller 185 is illustrated in FIG. 6. Therein, a cell voltage rate subroutine is reached through an entry point 230 and a first step 231 updates a next-preceding voltage by setting Vcell_n-1 equal to Vcell_n. Then a step 232 establishes a current value of cell voltage, Vcell_n, equal to the voltage on the line 156, V_156 or other indication of cell voltage. If desired, the cell voltage could be established as an average of a group of cells or a single cell, or otherwise, in other embodiments. The embodiment herein may be modified to perform with a variety of cell voltage selections.

Figure 11:
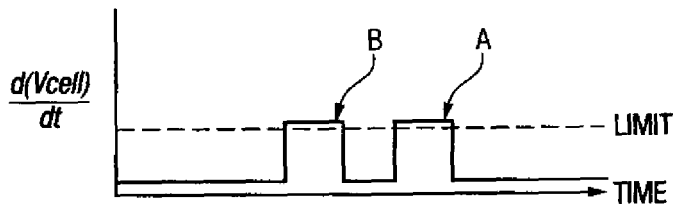

Then, a test 233 determines whether an enable VLD flag (described shortly) has been set, or not. Before an upward transition in cell stack voltage, the enable VLD flag will not have been set, so a negative result reaches a test 237, at the heart of the present modality, which determines if the time derivative of the fuel cell voltage exceeds a predetermined limiting rate. This is done by determining if the difference between the present cell voltage (set in step 232) and a next preceding cell voltage, Vcell_n-1 (set in step 231), equals or exceeds the predetermined limit, depending on the frequency of reaching test 237. See FIG. 11.

If test 237 is negative, other programming is reverted to through a return point 241. The VLD will not have been enabled in this pass through the routine.

In a subsequent pass through the cell volt rate routine, an affirmative result of test 237 will reach steps 239 and 240 to set an enable VLD flag, and to enable the clock that gates FIGS. 2 and 3. This flag indicates the condition of operating the embodiments of FIGS. 2 and/or 3 such as enabling the generation of clock pulses on the line 212, or operating other VLD effectuators, such as the diverter valve 177 (FIG. 1).

Figure 12:
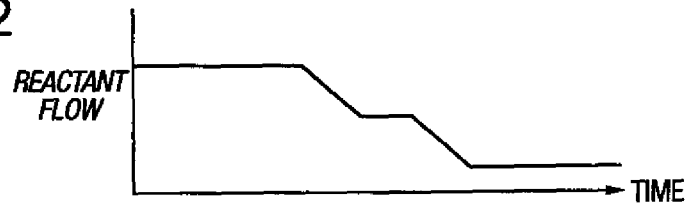
Figure 13:
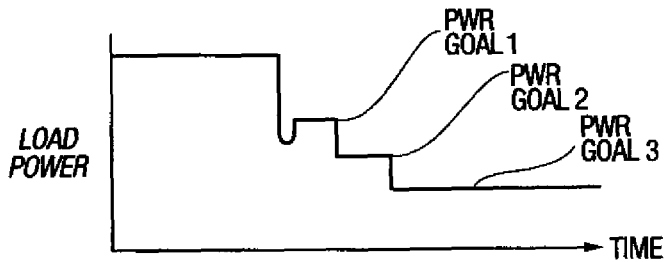
Figure 14:

After this time, the Balance of Plant (BOP) will reduce reactant flow to the fuel cells (FIG. 12) so that load power is reduced (FIG. 13). If test 243 indicates that the load power is not yet below the present load power goal, which had been predetermined to be an appropriate power level to interrupt the voltage limiting process, other programming is reverted to through the return point 241. Of course, other VLD methods may be utilized.

Should the enable VLD flag be set in the step 233, a first test 237 thereafter determines if the current fuel cell load power is less than a present, predetermined load power goal, of a potential series of goals (as discussed hereinafter).

If test 243 is affirmative, it means that the job of handling of a downward power transition without serious high voltages in the fuel cells is either completed, point A, FIG. 13, or has reached a VLD interval, point B, FIG. 13, so an affirmative result of test 243 will reach steps 244 and 245, to reset the enable VLD flag and disable the clock.

To control the desired number of load goals and VLD intervals (FIGS. 11-14), a test 251 determines if a goal counting number, G, has reached a predetermined limit, G LIMIT, indicating the number of desired goals. If not, the number G is incremented in a step 253, and other programming is reverted to through the return point 241. If so, G is set to one, or any convenient number, in a step 255 for use in subsequent power reduction events.

Instead of sensing a desired fuel cell load power goal to interrupt or end the process of the present modality, as described with respect to FIG. 6, the period of time the enable VLD flag remains set (and the clock enabled) might instead be determined by an ordinary timer as illustrated in FIG. 6A. Therein, a test 243a determines if the current time indicated by a timer equals or exceeds the present time interval goal, TIME_G. If not, other programming is reached through the return point 241 as in FIG. 6. But if so, an affirmative result of test 243a reaches steps 244, 245 to reset the enable VLD flag and to disable the clock. Then the routine continues through test 251, as it would in the embodiment of FIG. 6.

Conventional filtering (not shown) should be carried out in the controller 185 to avoid false responses. The limiting rate of fuel cell voltage change may be adjusted in successive intervals of voltage limiting.

Figure 7:
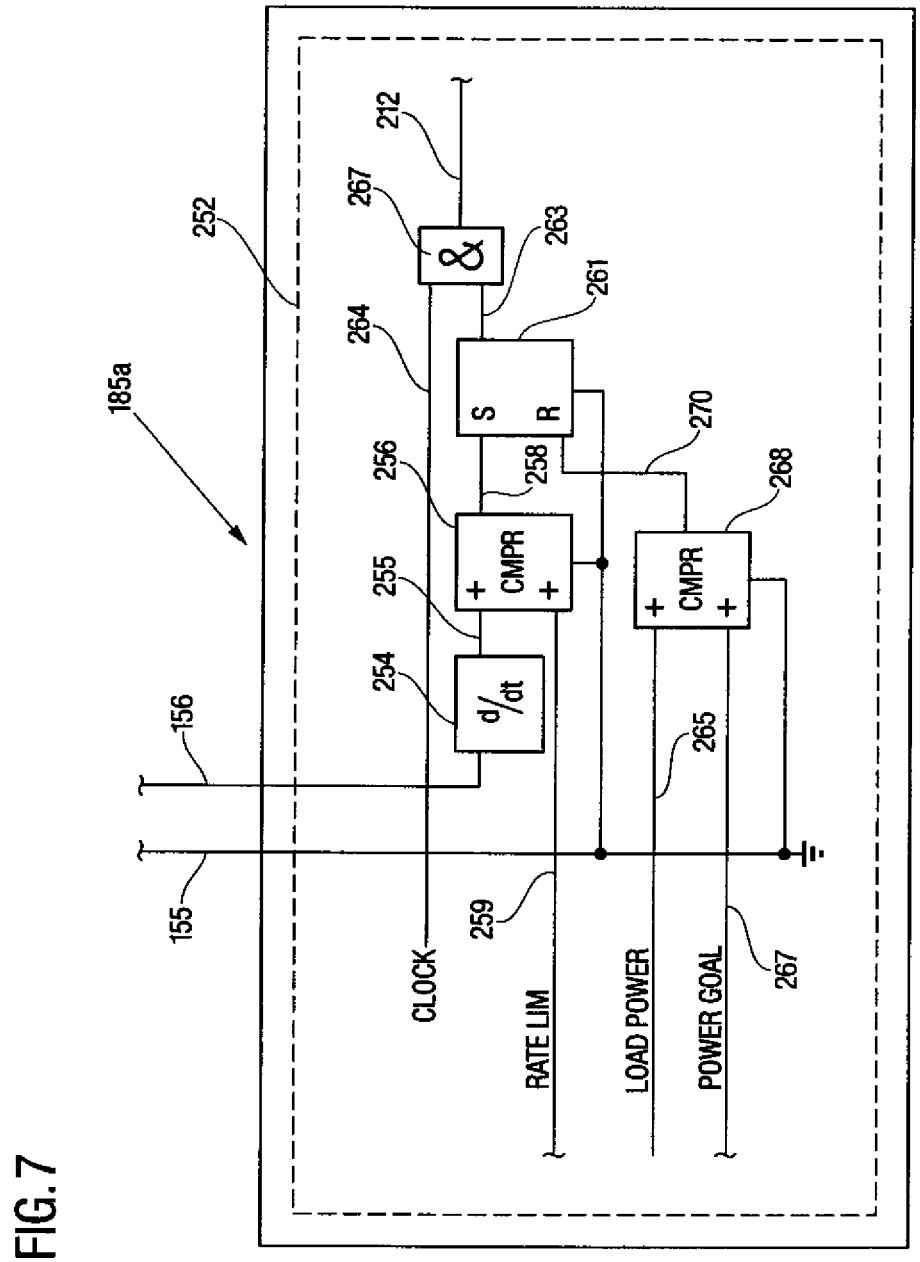
FIG. 7 is an analog illustration of functions for performing a rudimentary embodiment of the modality herein, with a single load power goal.

FIG. 7 illustrates a purely exemplary analog version of a cell voltage limiting process 185a in a simplified block diagram 252 of the present modality, relating to initiating VLD operation in response to an excessive positive rate of change of cell voltage.

In FIG. 7, a differentiator 254 provides a signal on a line 255 to a compare circuit 256. The other input to the compare circuit is the rate limiting signal on a line 259. If the derivative of fuel cell voltage on line 255 is not greater than the rate limiting signal on the line 259, there will be no signal on a line 258. But if the derivative of cell stack voltage on the line 255 exceeds the rate limit signal on line 259, a signal will appear on the line 258 to set a latch 261. Once the latch is set, a signal on a line 263 will gate the clock signals on a line 264 through an AND circuit 267, to provide the pulses on the line 212 (Point B, FIG. 11).

After the cell stack load power on line 265 is reduced below the predetermined load power goal on line 267, a compare circuit 268 will provide a signal on a line 270 to reset the latch 261. This ends the voltage limiting operation.

Enabling VLD in response to a shutdown will occur rapidly in embodiments of FIGS. 6, 6A and 7.

The aforementioned patent disclosures are incorporated herein by reference.

Since changes and variations of the disclosed embodiments may be made without departing from the concept's intent, it is not intended to limit the disclosure other than as required by the appended claims.

The invention claimed is:

1. A method, comprising:
responding to excess power generation of a fuel cell power plant caused by a load power reduction transition from a first level of power demanded by a load, to a second level of power demanded by the load, the second level being lower than the first level;
determining a rate of change of a voltage of at least one fuel cell in the fuel cell power plant using an electronic differentiator;
outputting the rate of change from the electronic differentiator in the form of an analog signal; and
connecting a voltage output of fuel cells of the fuel cell power plant to at least one fuel cell voltage limiting device for a period of time in response to the analog signal indicating that the rate of change of the voltage of at least one fuel cell in the fuel cell power plant exceeds a predetermined limiting voltage rate of change.

2. A method, comprising:
determining a rate of change of a voltage of at least one fuel cell in a fuel cell power plant using an electronic differentiator;
determining that the rate of change of the voltage of the at least one fuel cell in the fuel cell power plant exceeds a predetermined limiting voltage rate of change as indicative of excess power generation of the fuel cell power plant caused by a power reduction transition from a first level of power demanded by a load, to a second level of power demanded by the load, the second level being lower than the first level; and
in response thereto, connecting the voltage of fuel cells of the power plant to at least one fuel cell voltage limiting device for a period of time.

3. A method according to claim 1 wherein the at least one fuel cell voltage limiting device is at least one from among a resistive auxiliary load and an energy storage system.

4. A method according to claim 2 wherein the period of time extends until the power output of the fuel cell power plant reaches a predetermined power goal.

5. A method according to claim 4 wherein the predetermined power goal is the second level of power.

6. A method according to claim 4 wherein the predetermined power goal is an interim power goal that is between the first level of power and the second level of power.

7. A method according to claim 6 wherein after the interim power goal is reached, again connecting the voltage of the fuel cells of the power plant to at least one fuel cell voltage limiting device for an additional period of time in response to an additional rate of change of a voltage of at least one fuel cell in the power plant exceeding a predetermined limiting value.

8. A method according to claim 7 wherein the additional period of time extends until the power output of the fuel cell power plant reaches a predetermined intervening power goal.

9. A method according to claim 8 wherein the intervening power goal is the second level of power.

10. A method according to claim 3 wherein the period of time extends until time out of a timer that is pre-initiated in response to a rate of change of a voltage of at least one fuel cell in the power plant exceeding a predetermined limiting value.

11. A method according to claim 10 wherein after time out of the timer, again connecting the voltage of the fuel cells of the power plant to at least one fuel cell voltage limiting device for an additional period of time in response to an additional rate of change of a voltage of at least one fuel cell in the power plant exceeding a predetermined limiting voltage.

12. A fuel cell power plant apparatus, comprising:
a fuel cell stack;
a first controller coupled to the fuel cell stack;
a voltage limiting device;
an electronic differentiator; and
a second controller coupled to the first controller and to the voltage limiting device, the second controller configured to control the voltage limiting device during power reduction transitions, from a first level of power demanded by a load, to a second level of power demanded by the load, the second level being lower than the first level, to extract, in the form of electrical power output, energy generated by the fuel cell stack, the electrical output being provided for a period of time, the first controller being configured to control the second controller in response to a determination, made using the electronic differentiator, that a rate of change of a voltage of at least one fuel cell in the fuel cell stack exceeds a predetermined limiting voltage rate of change.

13. The apparatus according to claim 12 wherein the second controller includes an electronic switch gated on and off by a signal from the first controller.

14. The apparatus according to claim 12 wherein the voltage limiting device includes an electric battery that is responsive to the electrical power output and is configured to store corresponding energy, the electrical output being configured to be provided for the period of time to the electric battery to limit a maximum over time of an average voltage in the fuel cells of the fuel cell stack caused by the transition.

15. The apparatus according to claim 12 wherein the voltage limiting device includes an energy storage system responsive to electrical power output and configured to store corresponding energy.

16. The apparatus according to claim 15 wherein the energy storage system includes a capacitor.

17. The apparatus according to claim 12 wherein the period of time extends until the power output of the fuel cell power plant reaches a predetermined power goal.

18. The apparatus according to claim 17 wherein the predetermined power goal is the second level of power.

19. The apparatus according to claim 17 wherein the predetermined power goal is an interim power goal which is between the first level of power and the second level of power.

20. The apparatus of claim 12 wherein the voltage limiting device includes a resistive auxiliary load responsive to electrical power output provided to dissipate corresponding energy, the electrical power output being provided to the resistive auxiliary load for the period of time to dissipate heat to limit a maximum over time of an average voltage in the fuel cells of the fuel cell stack caused by the transition.

21. The apparatus of claim 12 wherein the voltage limiting device includes a resistive auxiliary load and an energy storage system.

* * * * *